(12) United States Patent
Gamble et al.

(10) Patent No.: US 6,431,718 B1
(45) Date of Patent: Aug. 13, 2002

(54) INTERCONNECTOR AND LIGHT PIPE GUIDE FOR DISK DRIVE AND DISK DRIVE CARRIER

(75) Inventors: Eric T. Gamble; Edward J. McNulty, both of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/662,193

(22) Filed: Sep. 14, 2000

Related U.S. Application Data

(63) Continuation-in-part of application No. 09/401,210, filed on Sep. 22, 1999, now Pat. No. 6,231,224.

(51) Int. Cl.$^7$ .............................. F21V 33/00; H05K 5/00
(52) U.S. Cl. ........................ 362/85; 362/133; 362/559; 361/685; 439/928.1
(58) Field of Search ................................ 361/685, 727, 361/797; 439/76.1, 676, 928.1; 362/85, 89, 132, 133, 234, 253, 551, 559

(56) References Cited

U.S. PATENT DOCUMENTS

| | | | | |
|---|---|---|---|---|
| 4,692,842 A | * | 9/1987 | Joly et al. ................... | 361/413 |
| 4,899,254 A | * | 2/1990 | Ferchau et al. ............. | 361/685 |
| 4,941,841 A | * | 7/1990 | Darden et al. ............. | 439/76.1 |
| 5,187,643 A | * | 2/1993 | I-Shou ....................... | 361/685 |
| 5,340,340 A | * | 8/1994 | Hastings et al. ......... | 439/928.1 |
| 5,579,204 A | * | 11/1996 | Nelson et al. ............... | 361/685 |
| 5,654,873 A | * | 8/1997 | Smithson et al. ........... | 361/685 |
| 5,721,838 A | * | 2/1998 | Takahashi et al. .......... | 361/685 |
| 5,764,481 A | * | 6/1998 | Ruch et al. ................. | 362/685 |
| 6,064,569 A | * | 5/2000 | Sands et al. ................ | 361/685 |
| 6,071,150 A | | 6/2000 | Tang et al. ................. | 439/638 |
| 6,088,221 A | * | 7/2000 | Bolognia .................... | 361/685 |
| 6,098,127 A | * | 8/2000 | Kwang ........................ | 710/62 |
| 6,317,334 B1 | * | 11/2001 | Abruzzini et al. .......... | 361/797 |

* cited by examiner

*Primary Examiner*—Alan Cariaso
(74) *Attorney, Agent, or Firm*—Andrew Dillon

(57) ABSTRACT

A carrier for a hot-pluggable disk drive has a frame with a pair of side walls, a front bezel, and a rear connector assembly. The disk drive mounts to the frame within its confines. The carrier also has pipes for transmitting light to the front bezel. The light pipes extend along the side wall from the front bezel to the rear connector assembly. The carrier is installed in the disk drive docking bay of a computer system. The rear end of the docking bay has a docking connector for interconnecting with the rear connector assembly, which also interconnects with the drive. The rear connector assembly is provided with a retainer for supporting the rearward ends of the light pipes. When the carrier is seated in the docking bay, the light pipes precisely align with activity lights at the back of the docking bay. The light emitted by the activity lights is transmitted through the light pipes and displayed at the front bezel for viewing by the user.

20 Claims, 9 Drawing Sheets

INTERCONNECTOR AND LIGHT PIPE GUIDE FOR DISK DRIVE AND DISK DRIVE CARRIER

This patent application is a continuation-in-part of U.S. patent application Ser. No. 09/401,210, filed Sep. 22, 1999, now U.S. Pat. No. 6,231,224, entitled *"Light Pipe Guide and Carrier for Hard Disk Drive,"* which is incorporated herein by reference.

BACKGROUND OF THE INVENTION

1. Technical Field

The present invention relates in general to disk drives and, more particularly, to a connector for a disk drive. Even more particularly, the present invention relates to an electrical connector for interconnecting a disk drive, a carrier for supporting the disk drive, and a docking bay into which the disk drive is inserted via the carrier.

2. Background Art

Hard disk drives (HDD) that are removable during operation in a computer or peripheral systems environment are sometimes referred to as "hot-pluggable." An HDD is typically mounted in a hard disk drive carrier prior to installation in a system. An HDD carrier is a frame-like structure which attaches to the HDD to assist in its insertion or removal from the system. HDD carriers also protect the HDD when it is outside of the systems environment. HDD carriers are typically constructed out of metal and/or polymeric materials.

The system contains several HDD's, each of which may be readily interchangeable in the system. The HDD's are mounted in bays in a chassis located within a system enclosure. The system typically has a drive connector and activity lights for each bay. Unfortunately, the connector and lights are usually located at the rear of the enclosure and are not visible once the HDD and carrier assembly is inserted into the bay. Thus, an apparatus and method for interconnecting a hot-pluggable drive in a system and monitoring the activity lights of the system while the drive is in operation is needed.

SUMMARY OF THE INVENTION

A carrier for a hot-pluggable disk drive has a frame with a pair of side walls, a front bezel, and a rear connector assembly. The disk drive mounts to the frame within its confines. The carrier also has pipes for transmitting light to the front bezel. The light pipes extend along the side wall from the front bezel to the rear connector assembly. The carrier is installed in the disk drive docking bay of a computer system. The rear end of the docking bay has a docking connector for interconnecting with the rear connector assembly, which also interconnects with the drive. The rear connector assembly is provided with a retainer for supporting the rearward ends of the light pipes. When the carrier is seated in the docking bay, the light pipes precisely align with activity lights at the back of the docking bay. The light emitted by the activity lights is transmitted through the light pipes and displayed at the front bezel for viewing by the user.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
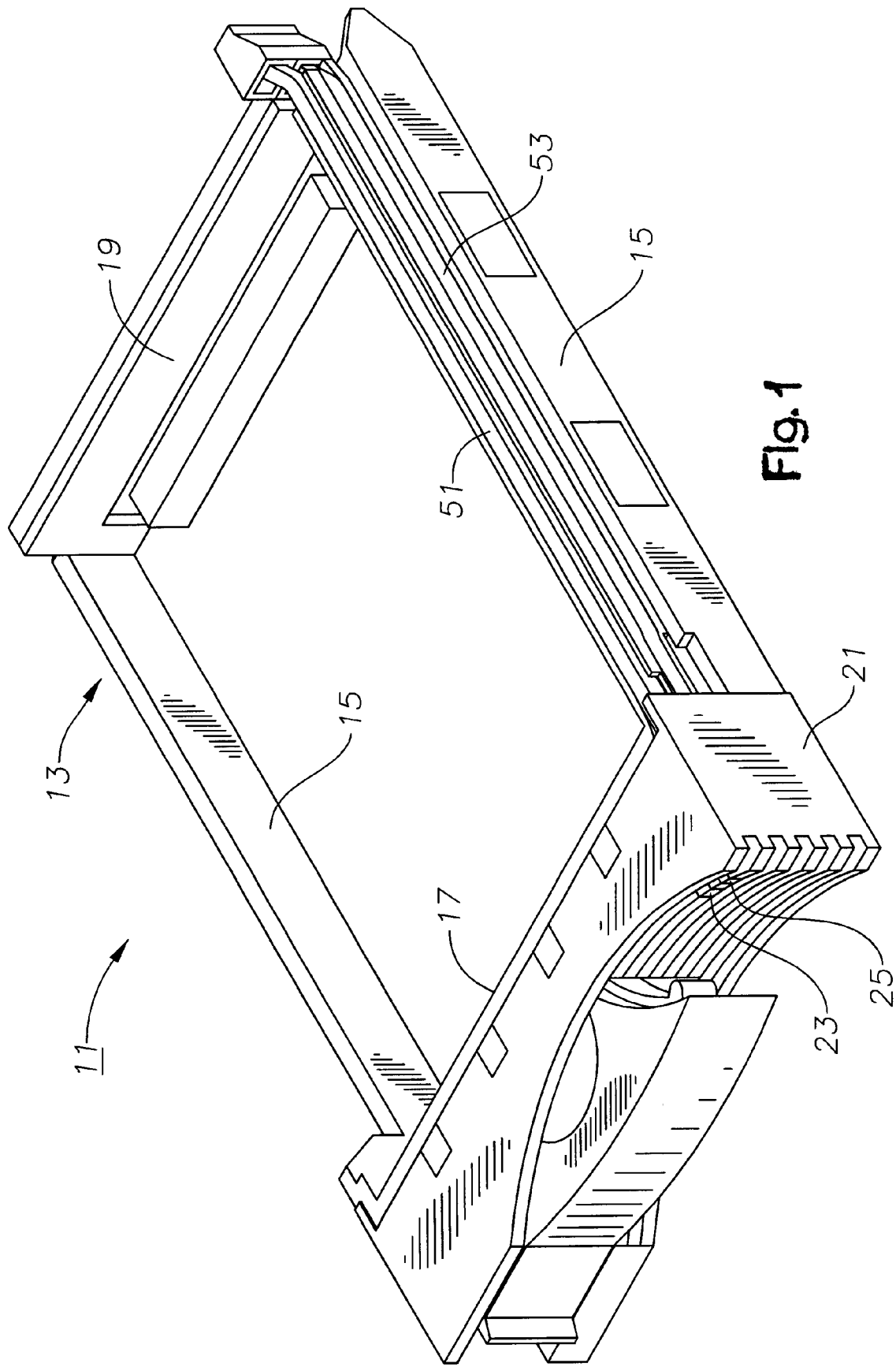
FIG. 1 is a front isometric view of a disk drive carrier assembly constructed in accordance with the invention.
Figure 2:
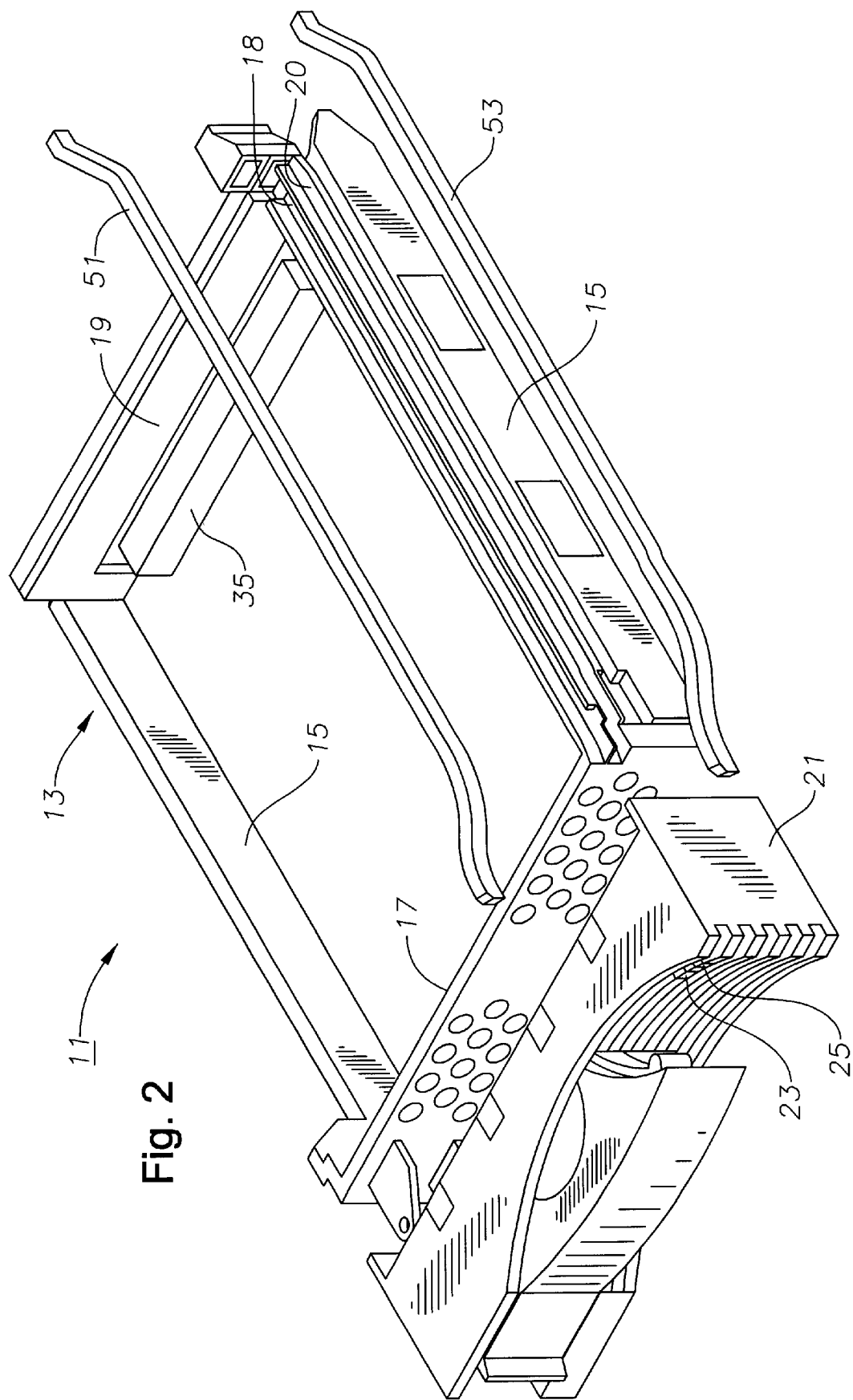
FIG. 2 is an exploded front isometric view of the drive carrier of FIG. 1.

Referring to FIGS. 1 and 2, a carrier 11 for a hot-pluggable disk drive is shown. Carrier 11 has a rigid, generally rectangular frame 13 with a pair of side walls 15, a front end 17, and a rear end 19. In one embodiment, frame 13 is zinc plaster cast and its side walls 15 and ends 17, 19 are orthogonal relative to each other. The disk drive (not shown) mounts to frame 13 within its confines.

The longitudinal outer surface of one of the side walls 15 has a pair of substantially parallel, square-shaped guide rails or channels 18, 20 with orthogonal surfaces. Channel 18 has three orthogonal support surfaces, including an upturned flange at its outer edge, and has an open top. Channel 20 also has three orthogonal support surfaces with an open side. A bezel 21 is mounted to front end 17 of frame 13 and has a pair of generally rectangular apertures 23, 25 (FIG. 2) that extend through it to its scalloped front surface. Apertures 23, 25 are horizontally oriented side-by-side in bezel 21.

Figure 9:
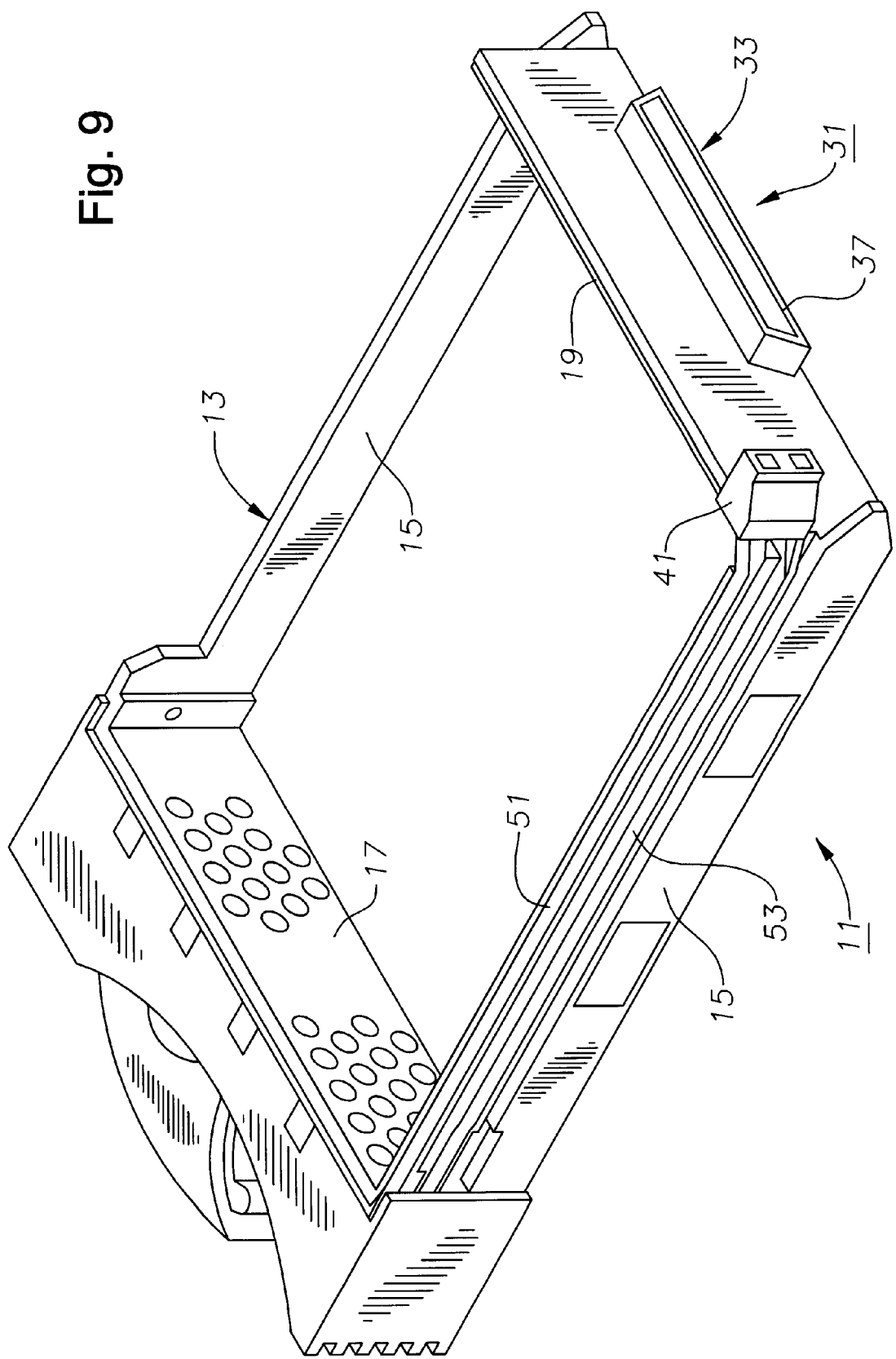
FIG. 9 is a rear isometric view of the drive carrier of FIG. 1.
Figure 10:
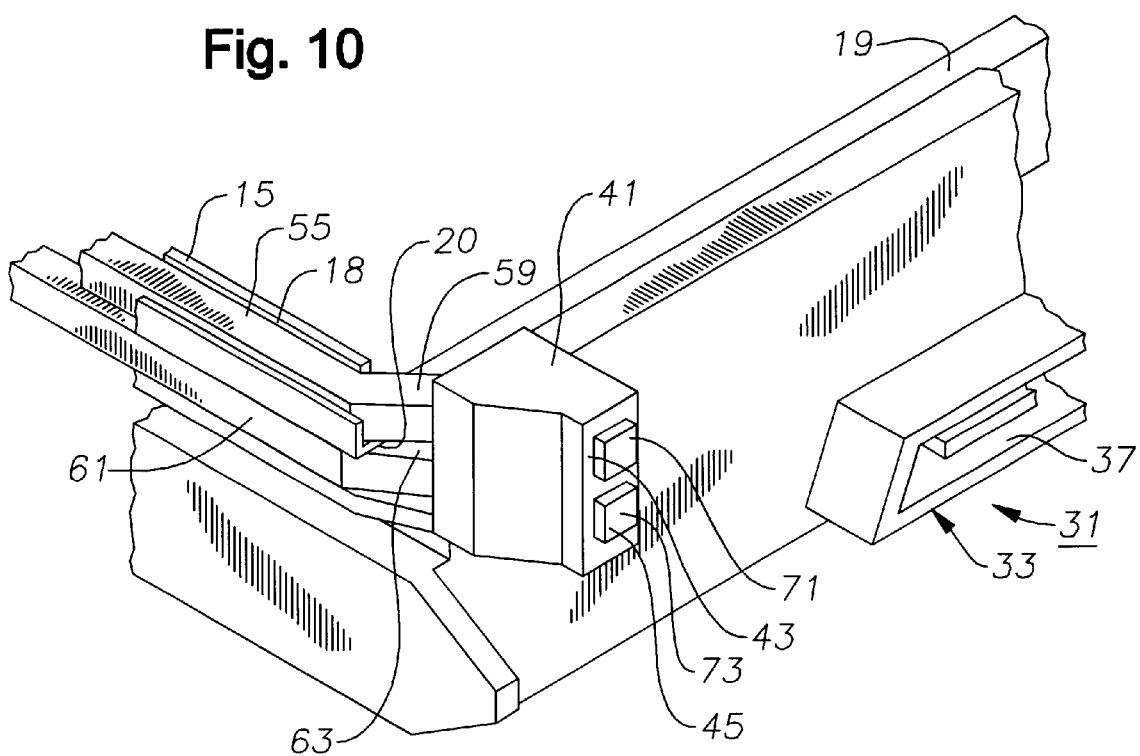
FIG. 10 is an enlarged rear isometric view of the drive carrier of FIG. 1.

As shown in FIGS. 9 and 10, a generally rectangular connector assembly 31 is mounted to the rear end 19 of frame 13. Connector assembly 31 has a connector 33 for electrically coupling the disk drive to a computer system. A front portion 35 of connector 33 (FIG. 2) interconnects to the disk drive, and a rear portion 37 interconnects to the computer system. Connector assembly 31 also comprises a retainer 41 located along one of its upper outer corners. Retainer 41 is a plastic shroud with a pair of tapered holes 43, 45 that are separated by a partition and oriented one on top of the other. The front ends of holes 43, 45 are wider and taper down to their respective rearward ends (FIG. 10).

Figure 3:
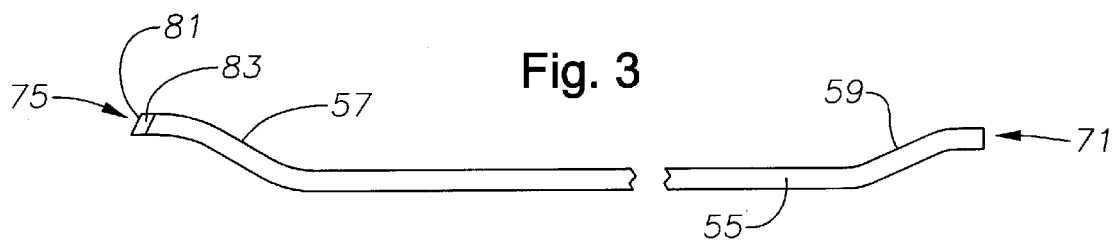
FIG. 3 is a top view of a first light conduit for the carrier of FIG. 1.
Figure 4:
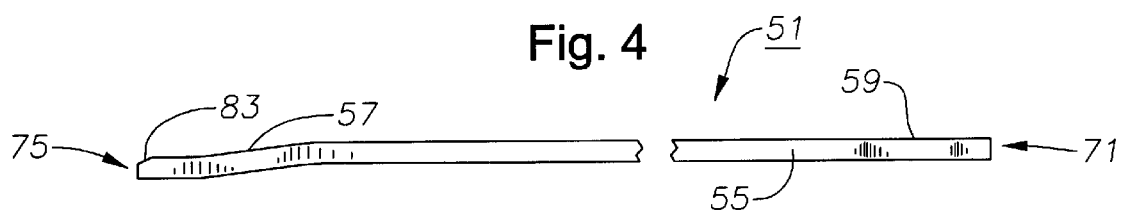
FIG. 4 is a side view of the first light conduit of FIG. 3.

Carrier 11 also comprises a pair of visible light conduits or pipes 51, 53 (FIG. 2). As shown in FIGS. 3–8, pipes 51, 53 are fairly similar in shape and are preferably constructed from solid square rods of clear acrylic. Pipe 51 has a long, substantially linear central portion 55, and front and rear portions 57, 59 that are angled and offset from central portion 55 as shown (FIGS. 3 and 4). Pipe 51 is configured in this manner so that, in operation, the direction of light transmission may be redirected to a desired location.

Figure 5:
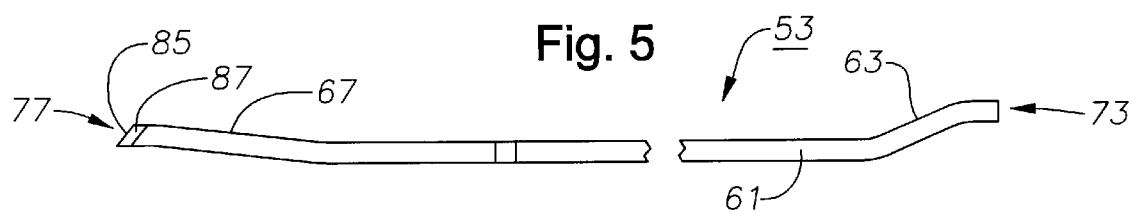
FIG. 5 is a top view of a second light conduit for the carrier of FIG. 1.
Figure 6:
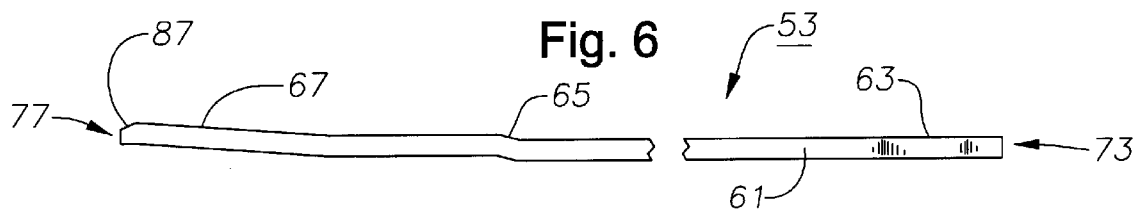
FIG. 6 is a side view of the second light conduit of FIG. 5.

As shown in FIGS. 5 and 6, pipe 53 has central and rear portions 61, 63 that are virtually identical to those portions 55, 59 of pipe 51, respectively, except for a small hitch 65 in central portion 61. The front portion 67 of pipe 53 angled and offset less dramatically than portion 57 of pipe 51. The rear ends 71, 73 of pipes 51, 53, respectively are orthogonally oriented relative to their longitudinal axes and four outer square surfaces. However, each of the front ends 75, 77 of pipes 51, 53 has a pair of tapers. Front end 75 of pipe 51 has a front taper 81 from its outer edge to its inner edge, and a top taper 83 from its top leading edge rearward. Similarly, front end 77 of pipe 53 has a front taper 85 from its outer edge to its inner edge, and a top taper 87 from its top leading edge rearward.

Figure 7:
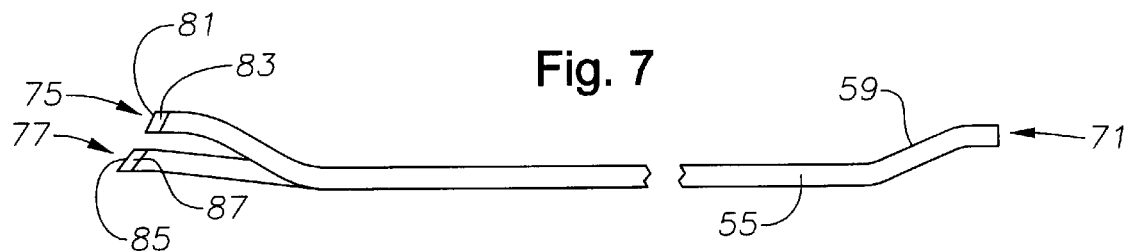
FIG. 7 is a top view of the first and second light conduits of FIGS. 3–6 illustrating their orientation relative to each other.
Figure 8:
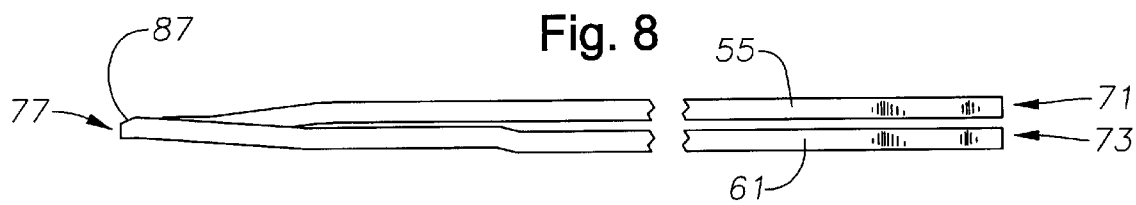
FIG. 8 is a side view of the first and second light conduits of FIGS. 3–6 illustrating their orientation relative to each other.

Referring now to FIGS. 7 and 8, the geometries of pipes 51, 53 are selected to reconfigure their orientation. Note that the rear ends 71, 73 of pipes 51, 53 are substantially vertically aligned and the front ends 75, 77 of pipes 51, 53 are substantially horizontally aligned. It is the previously described angles and offsets of the various portions of pipes 51, 53 that change the alignment. In addition, pipe 51 is slightly shorter than pipe 53 (FIG. 7) to accommodate for the scalloped front surface of bezel 21 of this particular embodiment. Pipes 51, 53 are perfectly contoured for this particular application, but may be sized and shaped to fit almost any geometry.

In operation (FIG. 1), light pipes 51, 53 are mounted in channels 18, 20 in the side wall 15 of base 13. Three of the four sides of each pipe 51, 53 locate against the orthogonal surfaces of the channels 18, 20, respectively. The rear portions 59, 63 of pipes 51, 53 are captured in holes 43, 45, respectively, of retainer 41 such that their rear ends 71, 73 are substantially flush therewith. Likewise, the front portions 57, 67 of pipes 51, 53 are captured in apertures 23, 25, respectively, of bezel 21 such that their front ends 75, 77 are substantially flush with the scalloped front surface of bezel 21. After a disk drive is mounted in frame 13, carrier 11 is ready for use.

Figure 11:
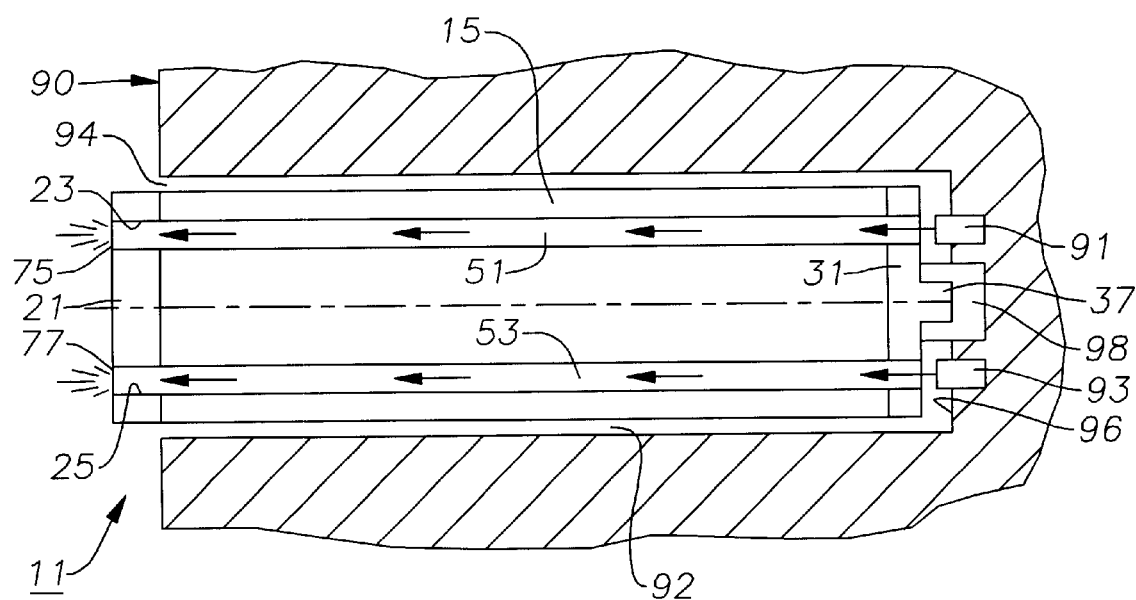
FIG. 11 is a simplified, schematic sectional side view of the drive carrier of FIG. 5 loaded in a computer system.
Figure 12:
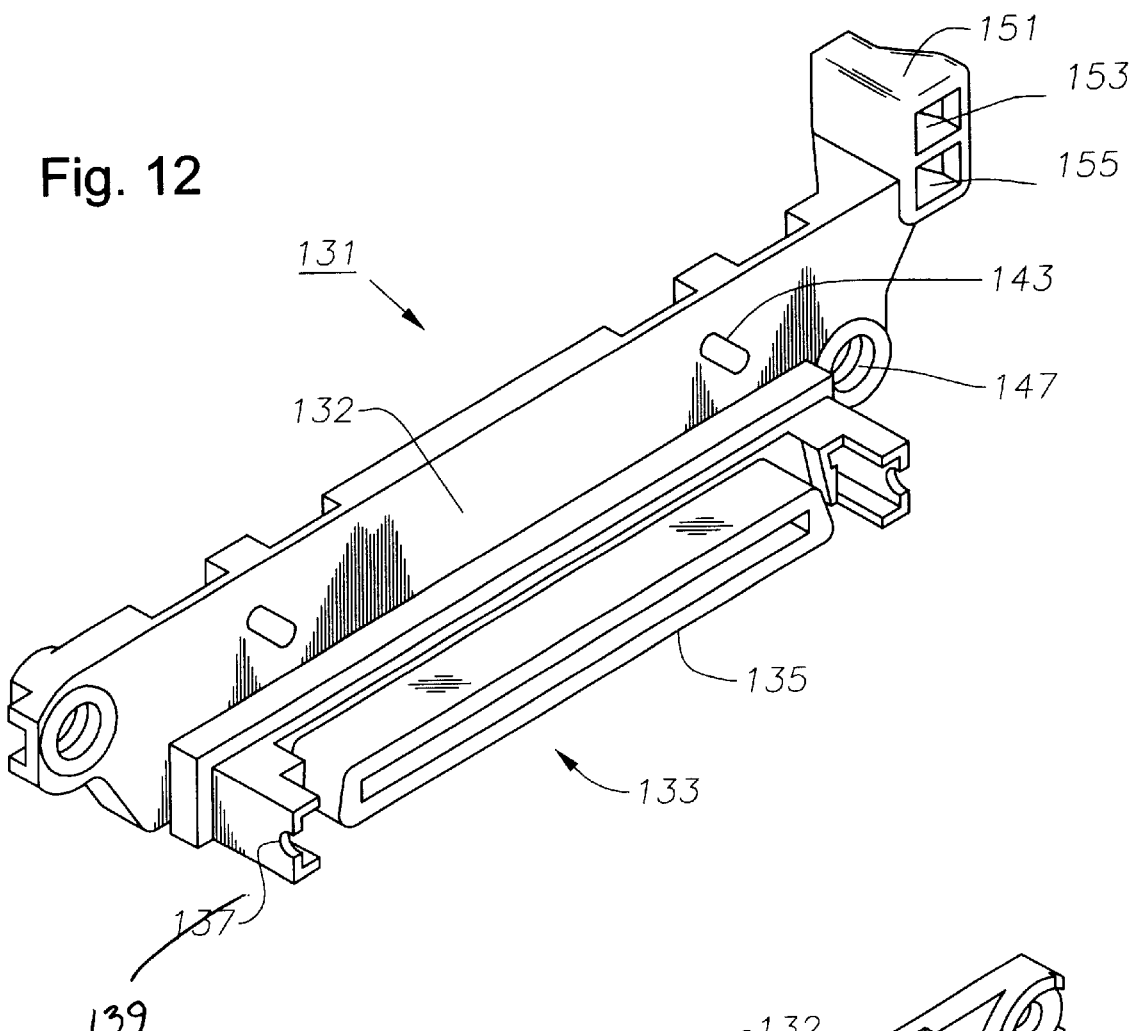
FIG. 12 is an enlarged, detailed, rear isometric view of a connector for the drive carrier of FIG. 1 and is constructed in accordance with the invention.
Figure 13:
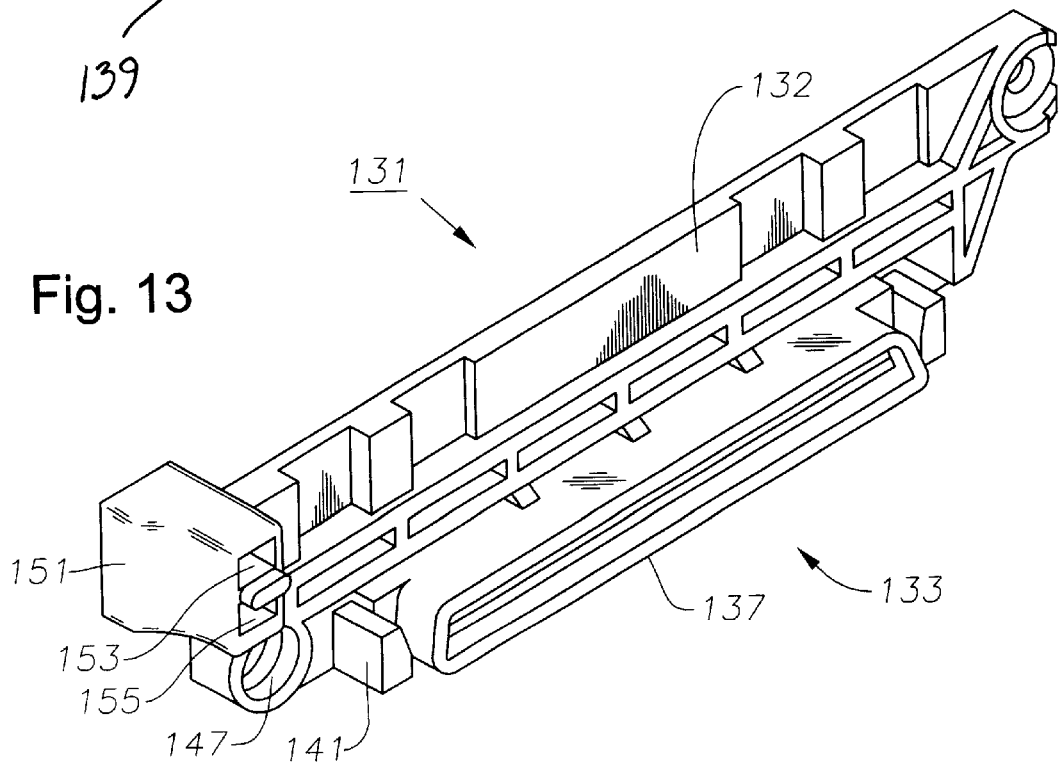
FIG. 13 is an enlarged, detailed, front isometric view of the connector of FIG. 12.

As shown in FIG. 11, carrier 11 is designed to be used in a computer system 90 having a disk drive docking bay 92. Docking bay 92 has a front end 94 that receives carrier 11, and a rearward end 96 with a docking connector 98 on a circuit board. Docking connector 98 is provided for engaging the rear portion 37 of connector 33 on carrier 11.

A pair of vertically disposed LED activity lights 91, 93 are also located at the rearward end 96 of docking bay 92 on the circuit board. When carrier 11 is properly seated in docking bay 92, the rear ends 71, 73 are precisely aligned with lights 91, 93, respectively, and axially separated by a small clearance. The visible light emitted by lights 91, 93 is transmitted through pipes 51, 53 along the side wall 15 of carrier 11 and displayed at front ends 75, 77, respectively. Thus, even though lights 91, 93 are covered or blocked by carrier 11, the light they emit is viewable from the front side of carrier 11. This enables users to monitor the activity of the disk drive interactions with computer system 81.

Referring now to FIGS. 12–19, more detailed drawings of connector assembly 31 are depicted as an interconnector assembly 131. Like connector assembly 31, interconnector assembly 131 is provided for mechanically and electrically interconnecting the various components of the drive, carrier, docking bay to one another. Interconnector assembly 131 has a substantially planar body 132 with an integrally formed electrical connector 133 for electrically coupling a disk drive 134 (FIGS. 18 and 19) to a computer system (see, e.g., FIG. 11). A front portion 135 of connector 133 protrudes into the carrier 111 and engages a connector at the rearward end of disk drive 134. A rear portion 137 of connector 133 protrudes beyond the rear end of the carrier 111 and engages a connector in the docking bay of the computer system. Front portion 135 has receptacles 139 for capturing the disk drive connector, and rear portion 137 has alignment tabs 141 for ensuring compliance with the docking bay connector.

Figure 16:
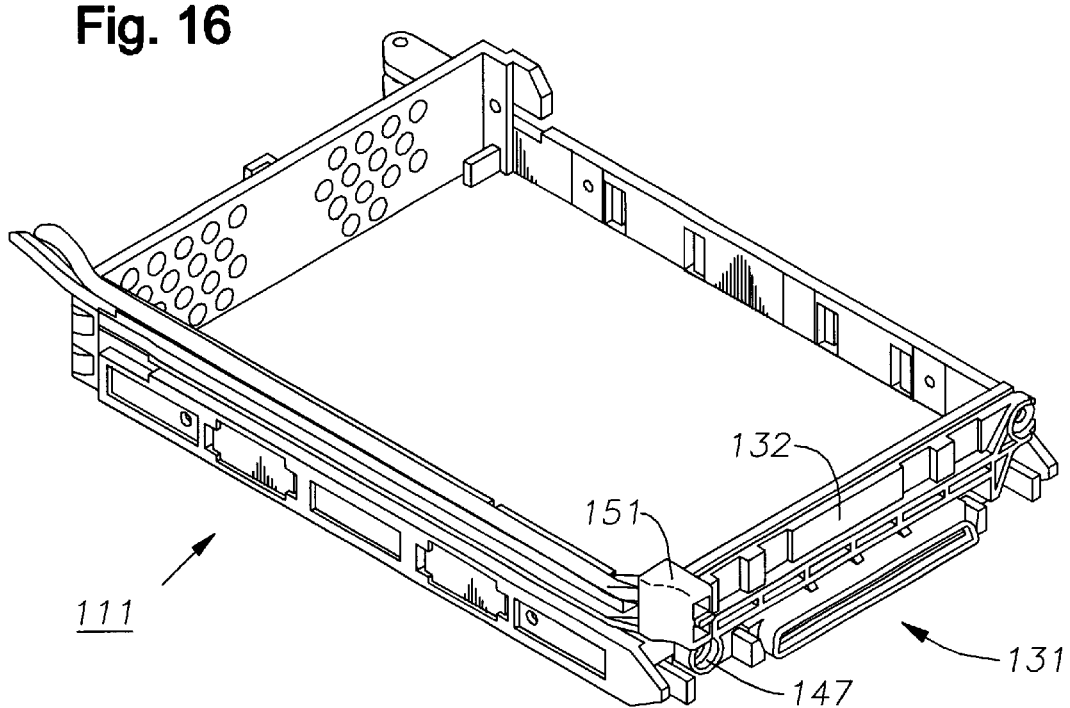
FIG. 16 is a rear isometric view of the connector of FIG. 12 shown mounted to the carrier assembly of FIG. 1.
Figure 17:
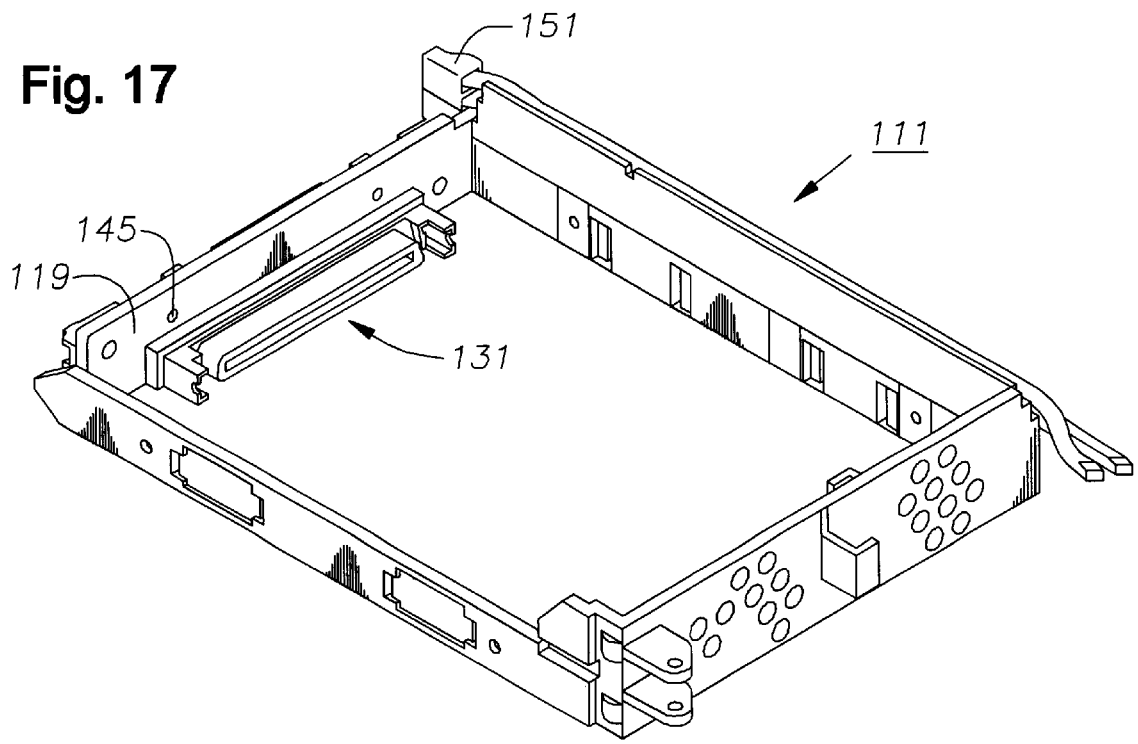
FIG. 17 is a front isometric view of the connector of FIG. 12 shown mounted to the carrier assembly of FIG. 1.
Figure 18:
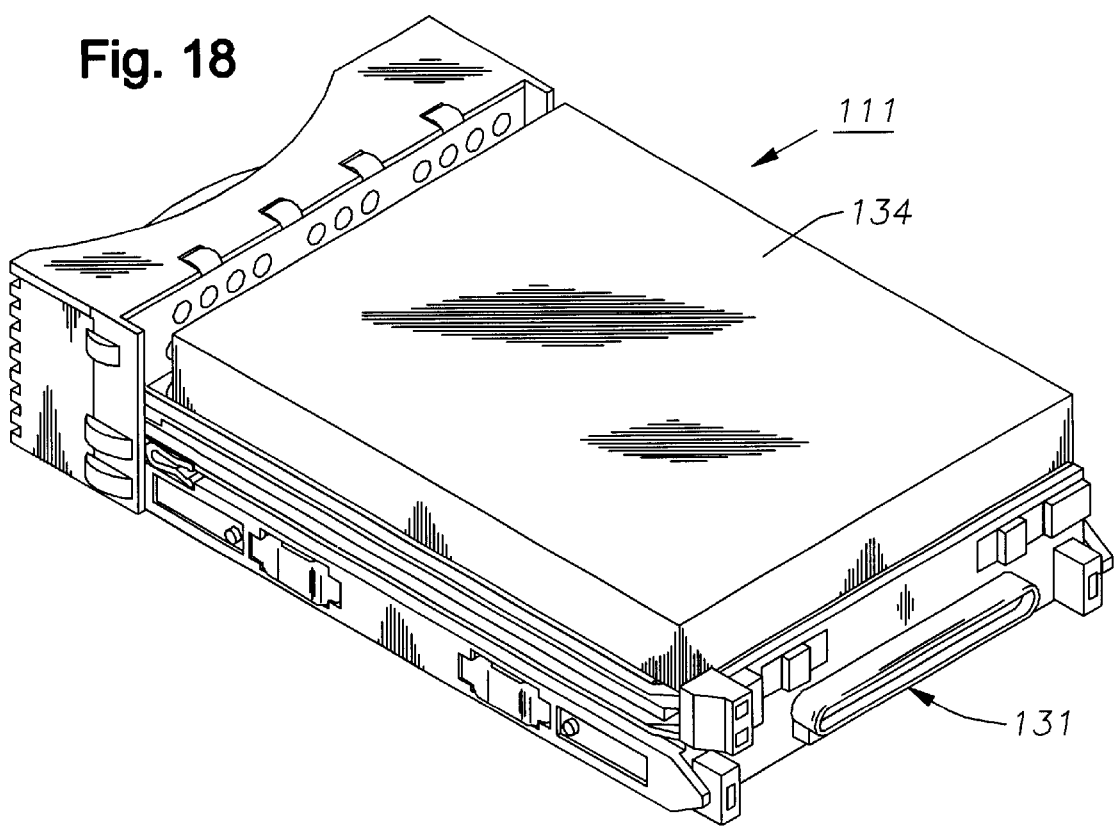
FIG. 18 is a left rear isometric view of the connector of FIG. 12 shown mounted to the carrier assembly of FIG. 1 and a disk drive.
Figure 19:
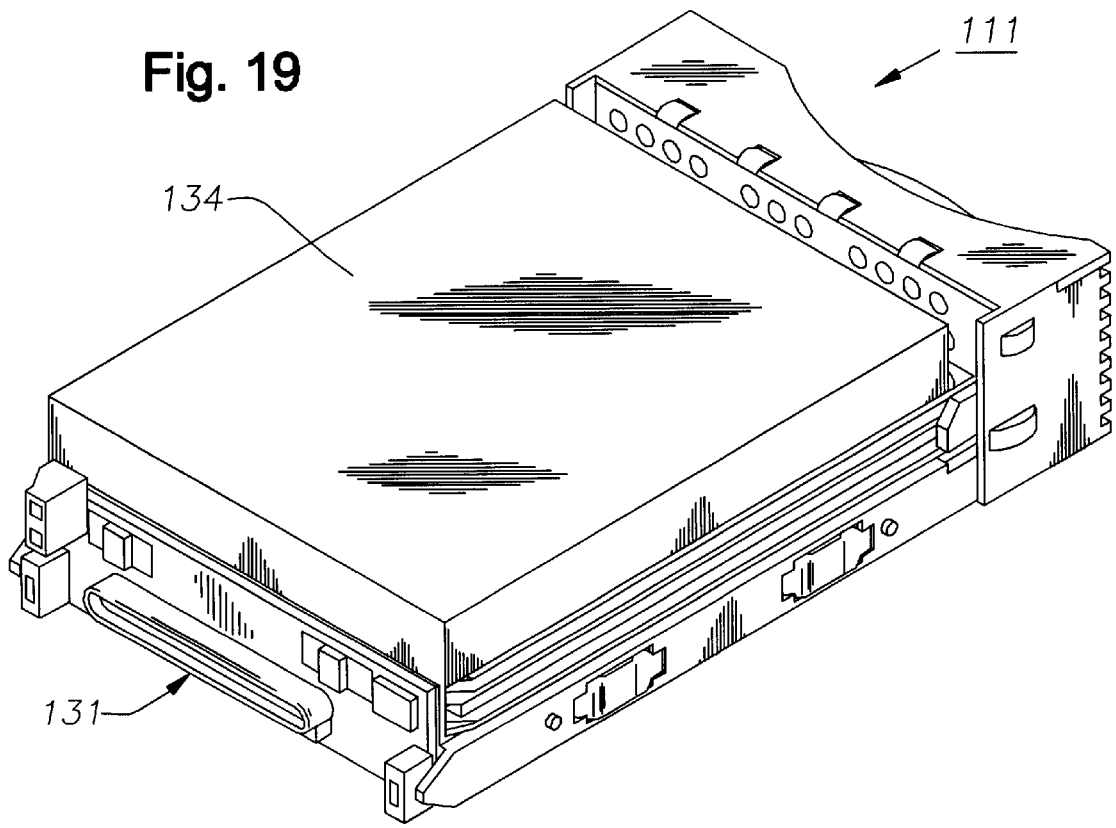
FIG. 19 is a right rear isometric view of the connector of FIG. 12 shown mounted to the carrier assembly of FIG. 1 and a disk drive.

As shown in FIGS. 16 and 17, the front surface of interconnector assembly 131 mounts substantially flush to the rear wall 119 of carrier 111. Body 132 is provided with mounting tabs 143 (FIG. 12) that insert into holes 145 in rear wall 119, and mounting holes 147 for fastening interconnector assembly 131 thereto. When properly installed, electrical connector 133 is positioned beneath rear wall 119.

Figure 14:
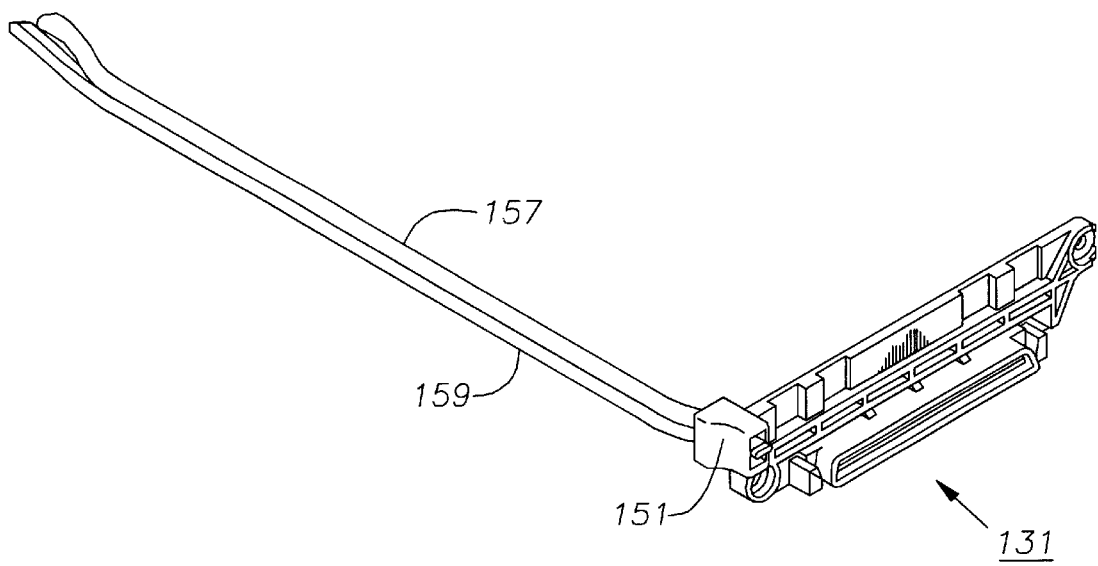
FIG. 14 is a rear isometric view of the connector of FIG. 12 shown with the light conduits of the previous figures.
Figure 15:
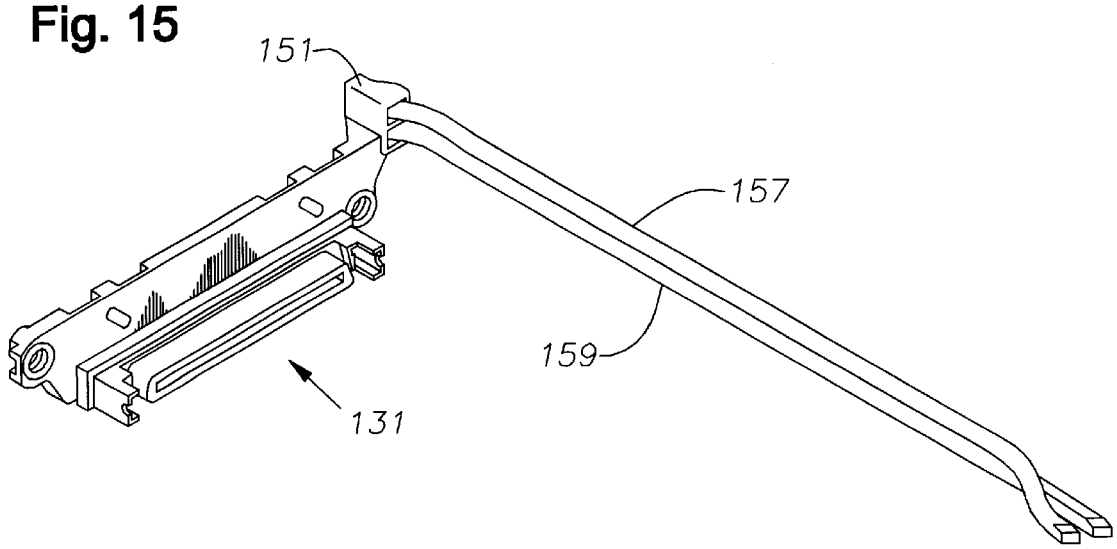
FIG. 15 is a front isometric view of the connector of FIG. 12 shown with the light conduits of the previous figures.

Interconnector assembly 131 also has a retainer 151 that is integrally formed with body 132 to provide better tolerance. In the embodiment shown, retainer 151 is located at an upper outer corner of body 132, and comprises a rigid shroud with a pair of tapered holes 153, 155 that are separated by a partition and oriented one on top of the other. The front ends of holes 153, 155 are wider and taper down to their respective rearward ends (see FIGS. 12 and 13). Holes 153, 155 capture the rearward ends of light pipes 157, 159 (FIGS. 14 and 15). No mechanical fasteners are required to secure light pipes 157, 159. Their front and rear ends are secured and precisely retained by the carrier and retainer 151 on interconnector assembly 131, respectively. The other elements of carrier 111 and light pipes 157, 159 are essentially the same as described above for the previous figures.

In operation, disk drive 134 is secured to carrier 111 and electrically interconnects with front portion 135 of connector 133. When carrier 11 is inserted into the docking bay of a computer system (see, e.g., FIG. 11), rear portion 137 of connector 133 engages and electrically interconnects with the connector at the back of the docking bay. At the same time, the integrally formed retainer 151 precisely aligns the light pipes 157, 159 with activity lights at the back of the docking bay. The light emitted by the activity lights is transmitted through pipes 157, 159 along the side of carrier 111 and displayed at its front end. Thus, even though the docking bay connector and activity lights are not visible when carrier 111 is being installed, electrical and mechanical compliance between disk drive 134 and the computer system are assured via interconnector assembly 131.

The present invention has several advantages. The interconnector assembly is a unique integrated package that provides precise mechanical and electrical connections between the disk drive, the disk drive carrier, and the docking bay of the host system. The carrier utilizes the interconnector assembly to align two or more outboard light pipes that are capable of changing the orientation of the activity lights to any configuration. The special tapers at the front end of the light pipes by the bezel also maximize visibility of the light emitted. The interconnector design is also simple, less expensive, and is a unique way of aligning the light pipes in tight dimensional control with respect to the carrier that will dock to the same circuit board containing the LED's that feed the light pipes. The tunnel-like design of the retainer traps, guides, supports, and aligns the ends of the light pipes without adding any parts or requiring additional tooling. By linking the dimensional control of a retainer and an electrical connector to the same part, better tolerance control is gained. The compact size of the overall design also achieves the most aggressive packaging in the industry for hot plug disk drives.

While the present invention has been shown or described in only some of its forms, it should be apparent to those skilled in the art that it is not so limited, but is susceptible to various changes without departing from the scope of the invention.

What is claimed:

1. A carrier for a computer system disk drive, the computer system having an enclosure, a docking bay located within the enclosure for receiving the carrier, and a docking bay connector and an activity light located at a rearward end of the docking bay, the carrier comprising:

a frame having a front end and a rear end, the frame being adapted to support a hot-pluggable disk drive between the front and rear ends; and an interconnector assembly mounted adjacent to the rear end of the frame, the interconnector assembly having an electrical connector for electrically coupling the disk drive to the computer system, and an integrally formed retainer in the interconnector assembly for aligning a light conduit relative to the activity light in the docking bay so that light emitted by the activity light is transmitted to the front end of the frame.

2. The carrier of claim 1 wherein the electrical connector of the interconnector assembly has a front portion protruding into the carrier for engaging a disk drive connector, and a rear portion protruding beyond the rear end of the carrier for engaging the docking bay connector.

3. The carrier of claim 1 wherein the electrical connector has receptacles for capturing a disk drive connector, and alignment tabs for ensuring compliance with the docking bay connector.

4. The carrier of claim 1 wherein the interconnector assembly has mounting tabs that engage holes in the rear end of the frame, and mounting holes for fastening the interconnector assembly to the frame.

5. The carrier of claim 1 wherein the electrical connector is located beneath the rear end of the frame.

6. The carrier of claim 1 wherein the retainer is located at a corner of the interconnector assembly.

7. The carrier of claim 1 wherein the retainer comprises a rigid shroud with an opening for capturing a rear end of the light conduit.

8. The carrier of claim 7 wherein the opening in the retainer is a tapered hole.

9. A carrier for a computer system disk drive, the computer system having an enclosure, a docking bay located within the enclosure for receiving the carrier, and a docking bay connector and an activity light located at a rearward end of the docking bay, the carrier comprising:

a frame having a front end and a rear end, the frame being adapted to support a hot-pluggable disk drive between the front and rear ends; and an interconnector assembly mounted adjacent to the rear end of the frame, the interconnector assembly having an electrical connector with a front portion protruding into the carrier for electrically coupling to a disk drive connector, a rear portion protruding beyond the rear end of the carrier for engaging the docking bay connector, and a rigid shroud that is integrally formed with and extends from the interconnector assembly, the shroud having an opening for capturing a rear end of a light conduit and aligning the light conduit relative to the activity light in the docking bay so that light emitted by the activity light is transmitted to the front end of the frame.

10. The carrier of claim 9 wherein the front portion of the electrical connector has receptacles for capturing the disk drive connector, and the rear portion has alignment tabs for ensuring compliance with the docking bay connector.

11. The carrier of claim 9 wherein the interconnector assembly has mounting tabs that engage holes in the rear end of the frame, and mounting holes for fastening the interconnector assembly to the frame.

12. The carrier of claim 9 wherein the electrical connector is located beneath the rear end of the frame.

13. The carrier of claim 9 wherein the shroud is located at a corner of the interconnector assembly.

14. The carrier of claim 9 wherein the opening in the shroud is a tapered hole.

15. An interconnector assembly for a computer system disk drive carrier, the computer system having an enclosure, a docking bay located within the enclosure for receiving the carrier, and a docking bay connector and an activity light located at a rearward end of the docking bay, the carrier having a front end and a rear end for supporting a hot-pluggable disk drive, the interconnector assembly comprising:

a generally planar body adapted to be mounted to the rear end of the carrier;

an electrical connector integrally formed with the body having a front portion for protruding into the carrier and electrically coupling to a disk drive connector, and a rear portion for protruding beyond the rear end of the carrier and engaging the docking bay connector; and a rigid shroud integrally formed with and extending from the body, the shroud having an opening for capturing a rear end of a light conduit and aligning the light conduit relative to the activity light in the docking bay so that light emitted by the activity light is transmitted to the front end of the carrier.

16. The interconnector assembly of claim 15 wherein the front portion of the electrical connector has receptacles for capturing the disk drive connector, and the rear portion has alignment tabs for ensuring compliance with the docking bay connector.

17. The interconnector assembly of claim 15 wherein the interconnector assembly has mounting tabs that engage holes in the rear end of the carrier, and mounting holes for fastening the interconnector assembly to the carrier.

18. The interconnector assembly of claim 15 wherein the shroud is located at a corner of the interconnector assembly.

19. The interconnector assembly of claim 15 wherein the opening in the shroud is a tapered hole.

20. The interconnector assembly of claim 15 wherein the shroud has a pair of vertically-oriented openings for capturing a pair of conduits.

* * * * *